US010878743B2

(12) United States Patent
Cho et al.

(10) Patent No.: US 10,878,743 B2
(45) Date of Patent: Dec. 29, 2020

(54) DISPLAY APPARATUS

(71) Applicant: LG Display Co., Ltd., Seoul (KR)

(72) Inventors: Namwook Cho, Paju-si (KR); Changsoo Kim, Paju-si (KR); Cheolhwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/167,399

(22) Filed: Oct. 22, 2018

(65) Prior Publication Data

US 2019/0130818 A1 May 2, 2019

(30) Foreign Application Priority Data

Oct. 27, 2017 (KR) ........................ 10-2017-0141111

(51) Int. Cl.

| | |
|---|---|
| ***G06F 3/044*** | (2006.01) |
| ***G06F 3/041*** | (2006.01) |
| ***G06K 9/00*** | (2006.01) |
| ***G09G 3/32*** | (2016.01) |
| ***G09G 3/3233*** | (2016.01) |
| *G09G 3/20* | (2006.01) |

(52) U.S. Cl.

CPC ............. *G09G 3/32* (2013.01); *G09G 3/3233* (2013.01); *G09G 3/20* (2013.01); *G09G 2300/0408* (2013.01); *G09G 2300/0426* (2013.01); *G09G 2300/0439* (2013.01); *G09G 2310/0278* (2013.01); *G09G 2310/0286* (2013.01); *G09G 2330/04* (2013.01)

(58) Field of Classification Search

None

See application file for complete search history.

(56) References Cited

U.S. PATENT DOCUMENTS

| | | | | |
|---|---|---|---|---|
| 5,684,555 A | 11/1997 | Shiba et al. | | |
| 6,567,064 B1 | 5/2003 | Song et al. | | |
| 10,019,088 B2 | 7/2018 | Kim et al. | | |
| 2006/0139288 A1* | 6/2006 | Fujita | G09G 3/3677 | 345/98 |
| 2007/0222737 A1* | 9/2007 | Kimura | G09G 3/3266 | 345/100 |
| 2008/0283883 A1* | 11/2008 | Shim | B82Y 10/00 | 257/292 |
| 2012/0306815 A1* | 12/2012 | Su | G06F 3/042 | 345/175 |
| 2014/0217924 A1* | 8/2014 | Sato | G09G 3/3233 | 315/294 |
| 2015/0254491 A1* | 9/2015 | Mo | G06F 3/0416 | 345/174 |
| 2017/0090629 A1 | 3/2017 | Kim et al. | | |

FOREIGN PATENT DOCUMENTS

| | | |
|---|---|---|
| KR | 10-0235473 B1 | 12/1999 |
| KR | 10-0326880 B1 | 4/2001 |
| KR | 10-2005-0051813 A | 6/2005 |
| KR | 10-2007-0084806 A | 8/2007 |
| KR | 10-1757918 B1 | 10/2011 |
| KR | 10-2013-0027335 A | 3/2013 |
| KR | 10-2017-0039056 A | 4/2017 |

* cited by examiner

*Primary Examiner* — Carl Adams
(74) *Attorney, Agent, or Firm* — Fenwick & West LLP

(57) ABSTRACT

A display apparatus includes a display panel including an active area that includes at least one module area and a bezel area positioned outside the active area, wherein a pixel array is positioned in the active area, and the at least one module area is formed as a light-transmissive area.

11 Claims, 3 Drawing Sheets

DISPLAY APPARATUS

CROSS-REFERENCE TO RELATED APPLICATIONS

This disclosure claims the benefit of priority under 35 U.S.C. § 119(a) to Republic of Korea Patent Application No. 10-2017-0141111 filed on Oct. 27, 2017, which is incorporated herein by reference in its entirety.

BACKGROUND

Field of the Disclosure

The present disclosure relates to a display apparatus.

Discussion of Related Art

As the information society has advanced, demand for display apparatuses for displaying images in various forms has increased. For example, flat panel displays (FPDs), which are thinner, lighter, and larger than bulky cathode ray tubes (CRTs) and able to replace them, have rapidly been developed. As such FPDs, various FPDs such as a liquid crystal display (LCD), a plasma display panel (PDP), an electroluminescent display (EL), a field emission display (FED), and an electrophoretic display (ED) have been developed and utilized.

Such display apparatuses include a display panel including display elements for displaying information, a driver for driving the display panel, and a power supply for generating power to be supplied to the display panel, and the driver.

These display apparatuses may have various designs according to use environments or purposes, and thus, display panels having a free-form part such as a partially curved part or a notch, beyond a conventional single quadrangular shape, have been widely used because they cause an esthetic sense.

In recent years, a variety of elements such as a camera, a speaker, and a sensor for implementing a multimedia function have been introduced in a module form. These elements are generally positioned in a region where a notch of the display panel is formed, that is, in a region formed by removing a portion of an edge of the display panel.

However, in order to secure the notch portion, the whole part of a partial cross-section of the display panel must be cut out, and thus, an additional mask must be used to implement it, complicating a manufacturing process.

SUMMARY

An aspect of the disclosure may provide a display apparatus in which various elements such as a camera, a speaker, a sensor, and the like, may be disposed in an active area of a display panel, without removing a part of the display panel.

According to an aspect of the disclosure, a display apparatus includes: a display panel including an active area including at least one module area and a bezel area positioned outside the active area, wherein a pixel array is positioned in the active area, and wherein the at least one module area is formed as a light-transmissive area.

The at least one module area may be positioned in the active area such that information is displayed in at least two regions of an upper side, a lower side, a left side, and a right side of the at least one module area.

The display apparatus further comprises a first potential supply electrode disposed in the bezel area to supply a first potential to the pixel array of the active area; a second potential supply electrode disposed in the bezel area to supply a second potential lower than the first potential to the pixel array of the active area; and first potential supply lines connected to the first potential supply electrode, extended to the active area, and disposed to avoid the at least one module area.

The display apparatus further comprises gate lines and data lines disposed in the active area to supply a gate signal and a data signal to the pixel array, wherein the gate lines and the data lines are disposed to avoid the at least one module area.

The display apparatus further comprises another first potential supply electrode disposed on the bezel area to supply the first potential to the pixel array.

Both ends of the first potential supply electrode and another first potential supply electrode are connected by link lines disposed in the bezel areas.

The display apparatus further comprises shift registers of a gate driver for generating a gate signal to be supplied to the pixel array may be disposed in the bezel area positioned on both sides of the active area.

Each pixel in the pixel array includes a light emitting diode (LED), a driving thin film transistor (TFT), at least one switching TFT and at least one storage capacitor.

Gate lines, data lines, power lines, and the electrodes are not formed in the at least one module area.

According to the display apparatus of the disclosure, it is possible to form the module region allowing light to be transmitted therethrough in the bezel area of the display panel through the display panel manufacturing process without using a separate mask, whereby a complicated manufacturing process may be avoided and manufacturing time and the cost may be reduced.

BRIEF DESCRIPTION OF DRAWINGS

The above and other aspects, features, and advantages of the disclosure will be more clearly understood from the following detailed description taken in conjunction with the accompanying drawings, in which.

DETAILED DESCRIPTION

Figure 1:
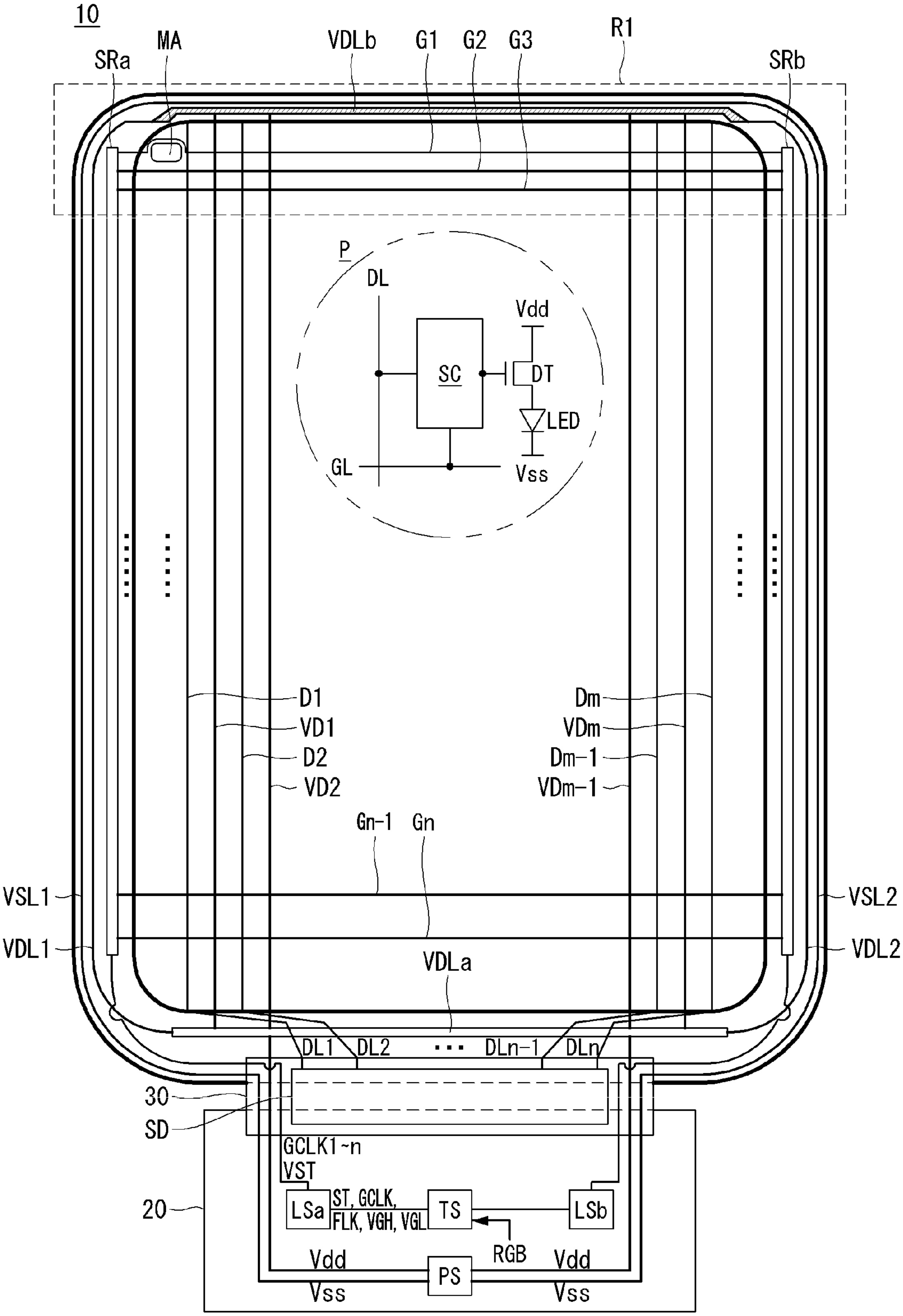
FIG. 1 is a block diagram illustrating a display apparatus according to an embodiment of the disclosure.

Advantages and features of the disclosure, and implementation methods thereof will be clarified through following embodiments described with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Further, the disclosure is only defined by scopes of claims.

The shapes, sizes, ratios, angles, numbers and the like disclosed in the drawings for describing the embodiments of the disclosure are illustrative and are not limited to those illustrated in the disclosure. Like reference numerals refer to like elements throughout the specification. Further, in the description of the disclosure, detailed description of known related arts will be omitted if it is determined that the gist of the disclosure may be unnecessarily obscured. Where the terms “comprises”, “having”, “done”, and the like are used in this disclosure, other portions may be added as long as “only” is not used. Unless the context clearly dictates otherwise, including the plural unless the context clearly dictates otherwise.

In analyzing constructional elements, the element is construed as including an error range although there is no explicit description.

In describing a position relationship, for example, when two portions are described as “~on”, “~above”, “~below”, or “~on the side”, one or more other portions may be positioned between the two portions unless “immediately” or “directly” is used.

It will be understood that, although the terms “first”, “second”, etc. may be used herein to describe various elements, these elements should not be limited by these terms. These terms are only used to distinguish one element from another. For example, a first element could be termed a second element, and, similarly, a second element could be termed a first element, without departing from the scope of the disclosure.

Features of various embodiments of the disclosure may be partially or overall coupled to or combined with each other, and may be variously inter-operated with each other and driven technically as those skilled in the art may sufficiently understand. The embodiments of the disclosure may be carried out independently from each other, or may be carried out together in co-dependent relationship.

Hereinafter, a display apparatus according to embodiments of the disclosure will be described in detail with reference to the accompanying drawings. Throughout the specification, the like reference numerals denote the substantially same elements. In the following description, when the detailed description of the relevant known function or configuration is determined to unnecessarily obscure an important point of the disclosure, the detailed description will be omitted or brief description will be provided.

Hereinafter, a display apparatus according to an embodiment of the disclosure will be described with reference to FIGS. 1 to 3.

FIG. 1 is a block diagram illustrating a display apparatus according to an embodiment of the disclosure. FIG. 2 is a plan view schematically illustrating a shape of a display panel illustrated in FIG. 1, and FIG. 3 is a cross-sectional view taken along line I-I' of FIG. 2.

Figure 2:
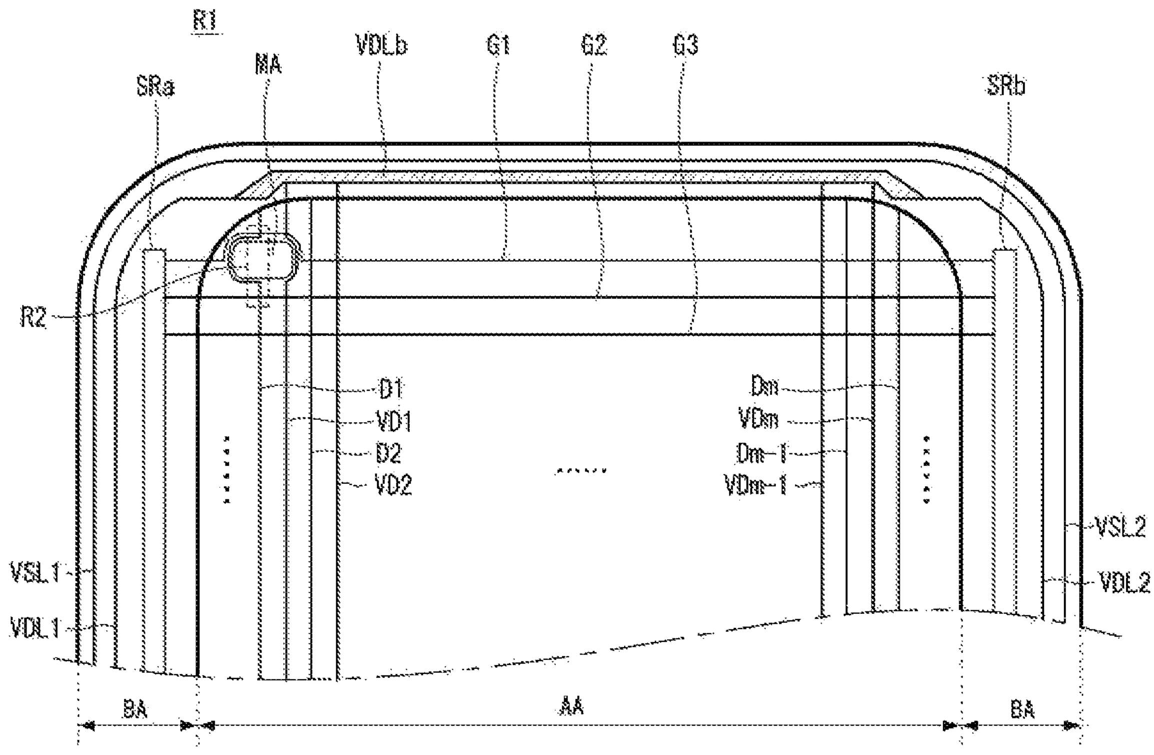
FIG. 2 is a plan view specifically illustrating an upper region of a display panel illustrated in FIG. 1 according to an embodiment of the disclosure.

Referring to FIGS. 1 and 2, a display apparatus according to an embodiment of the disclosure may include a display panel 10, a data driver, a gate driver, a power supply PS, a timing controller TC, and the like.

The display panel 10 includes an active area AA for displaying information and a bezel area BA which does not display information.

The active area AA is an area where an input image is displayed and a pixel array in which a plurality of pixels P are arranged in a matrix form is disposed.

The bezel area BA is an area where shift registers SRa and SRb of a gate driving circuit, various link signal lines (e.g., DL1 to DLm), link power supply lines VDL1, VDL2, VSL1, and VSL2, power supply electrodes VDLa and VDLb, and the like are disposed. The pixel array arranged in the active area AA includes a plurality of data lines D1 to Dm and a plurality of gate lines G1 to Gn arranged to intersect each other and pixels P arranged in a matrix form in the intersections.

Each pixel P includes a light emitting diode LED, a driving thin film transistor (hereinafter, referred to as a driving TFT DT) for controlling the amount of current flowing in the light emitting diode LED, and a programming part SC for setting a gate-source voltage of the driving TFT DT. The pixels P of the pixel array are supplied with a first voltage Vdd, as a high potential voltage, from the power supply PS through the first power lines VD1 to VDm, and are supplied with a second voltage Vss, as a low potential voltage, through second power lines VSL1 to VSL2.

The first power lines VD1 to VDm is supplied with the first voltage Vdd from the power supply PS at both sides through the lower first power supply electrode VDLa positioned in a bezel area BA at the side where a chip-on film 30 is adhered and the upper first power supply electrode VDLb disposed on the opposite bezel area. Both ends of the lower first power supply electrode VDLa and the upper first power supply electrode VDLb may be connected to each other by link lines VDL1 and VDL2. Accordingly, a degradation of display quality due to an increase in resistance capacitance (RC) according to positions of pixels disposed in the active area AA may be minimized.

The programming part SC may include at least one switching TFT and at least one storage capacitor. The switching TFT is turned on in response to a scan signal from the gate line GL, thus applying a data voltage from the data line DL to one electrode of the storage capacitor. The driving TFT DT controls a current amount supplied to the light emitting diode LED according to a magnitude of a voltage charged in the storage capacitor to regulate light intensity of the light emitting diode LED. Light intensity of the light emitting diode LED is proportional to the current amount supplied from the driving TFT DT.

TFTs constituting the pixel P may be implemented as a p-type or an n-type. Further, semiconductor layers of the TFTs constituting the pixel may include amorphous silicon or polysilicon, or an oxide. The LED includes an anode electrode, a cathode electrode, and a light emitting structure interposed between the anode electrode and the cathode electrode. The anode electrode is connected to the driving TFT DT. The light emitting structure includes an emission layer (EML), and a hole injection layer (HIL) and a hole transport layer (HTL) may be formed on one side of the emission layer and an electron transport layer (ETL) and an electron injection layer (EIL) may be disposed on the other side of the emission layer (EML).

The data driver includes a chip-on film 30 on which a data IC SD is mounted. One side of the chip-on film 309 is connected to one end of a source PCB 20 and the other side thereof is adhered to the bezel area BA of the display panel 10.

The data IC SD converts digital video data input from the timing controller TC into an analog gamma compensation voltage to generate a data voltage. The data voltage output from the data IC SD is supplied to the data lines D1 to Dm.

The gate driver may be a type in which a chip-on-film having a gate IC mounted thereon is disposed on one side of a display panel or a GIP type in which a gate IC is formed on the display panel. In the disclosure, the GIP type gate driver will be described as an example.

The GIP type gate driver includes level shifters LSa and LSb mounted on the source PCB 20 and shift registers SRa and SRb formed in the bezel area BA of the display panel 10 and receiving signals supplied from the level shifters LSa and LSb.

The level shifters LSa and LSb receive signals such as a start pulse ST, gate shift clocks GCLK, a flicker signal FLK, and the like, from the timing controller TC and receive a driving voltage such as a gate high voltage VGH, a gate low voltage VGL, and the like. The start pulse ST, the gate shift clocks GCLK, and the flicker signal FLK are signals swinging between approximately 0V and 3.3V. The gate shift clocks GCLK1-*n* are n-phase clock signals having a predetermined phase difference. The gate high voltage VGH is a voltage equal to or higher than a threshold voltage of a TFT formed in a TFT array of the display panel 10 and is about 28V. The gate low voltage VGL is a voltage lower than the threshold voltage of the TFT formed in the TFT array of the display panel 10 and is about −5V or so.

The level shifter LS level-shifts a start pulse ST and gate shift clocks GCLK input from the timing controller TC by a gate high voltage VGH and a gate low voltage VGL to output shift clock signals CLK. Therefore, a start pulse VST and shift clock signals CLK output from the level shifter LS swing between the gate high voltage VGH and the gate low voltage VGL. The level shifter LS may lower the gate high voltage according to a flicker signal FLK to lower a kick-back voltage $\Delta Vp$ of a liquid crystal cell to reduce flicker.

The output signals of the level shifter LS may be supplied to the shift register SR through lines formed in the chip-on film 30 in which the source drive IC SD is positioned and line-on-glass (LOG) lines formed at the substrate of the display panel 10. The shift register SR may be formed directly on the bezel area BA of the display panel 10 through a GIP process.

The shift register SR sequentially shifts gate pulses swinging between the gate high voltage VGH and the gate low voltage VGL by shifting the start pulse VST input from the level shifter LS according to the gate shift clock signals CLK1 to CLKn. The gate pulses output from the shift register SR are sequentially supplied to the gate lines G1 to Gn.

The timing controller TC synchronizes an operation timing of the data IC SD and the gate drivers LSa, LSb, SRa, and SRb upon receiving a timing signal such as a vertical synchronization signal, a horizontal synchronization signal, a data enable signal, and a main clock inputted from a host system (not shown). A data timing control signal for controlling the data IC SD may include a source sampling clock (SSC), a source output enable (SOE) signal, and the like. A gate timing control signal for controlling the gate drivers LSa, LSb, SRa and SRb may include a gate start pulse (GSP), a gate shift clock (GSC), gate output enable (GOE) signal, and the like.

In FIG. 1, a configuration in which the shift registers SRa and SRb are disposed at both sides of the active area AA outside the active area AA to supply gate pulses to the gate lines G1 to Gn from both ends of the active area AA is illustrated. However, the disclosure is not limited thereto and the shift register may be disposed only on one side of the active area AA to supply gate pulses to the gate lines G1 to Gn from one side of the active area AA. When the shift registers SRa and SRb are disposed on both sides outside the active area AA, gate pulses having the same phase and the same amplitude are supplied to the gate lines arranged in the same horizontal line of the pixel array.

Referring to FIG. 2, the display panel 10 of the disclosure includes the active area AA and the bezel area BA outside the active area AA.

The active area AA is an area where a pixel array for displaying information such as characters, figures, pictures, photographs, and images is arranged. The active area AA may include at least one module area MA positioned in a region adjacent to a corner of the active area AA or one side of the active area AA. The module area MA is an area where a camera, a speaker, a sensor, and the like are disposed. In the module area MA, signal lines including the gate lines G1 to Gn and the data lines D1 to Dm for supplying signals to the pixel array, the power supply lines VD1 to VDm, and the like are not disposed.

The module area MA may be disposed anywhere in the active area AA and information may be displayed on at least one of the upper side, the left side, the right side, and the lower side of the module area MA according to arrangement positions thereof.

The bezel area BA is an area surrounding the active area AA from the outside the active area AA. Shift registers SRa and SRb for generating a gate pulse to be supplied to the pixel array of the active area AA, signal lines for supplying various signals, and power supply lines for supplying various kinds of power are disposed in the bezel area BA.

Hereinafter, a cross-sectional structure of a display apparatus according to the disclosure will be described with reference to FIG. 3. FIG. 3 illustrates an example in which information is displayed on the upper side and the lower side of the module area MA, and this is to help understanding of the disclosure. Therefore, the disclosure should not be construed as being limited to FIG. 3 and the related description.

Figure 3:
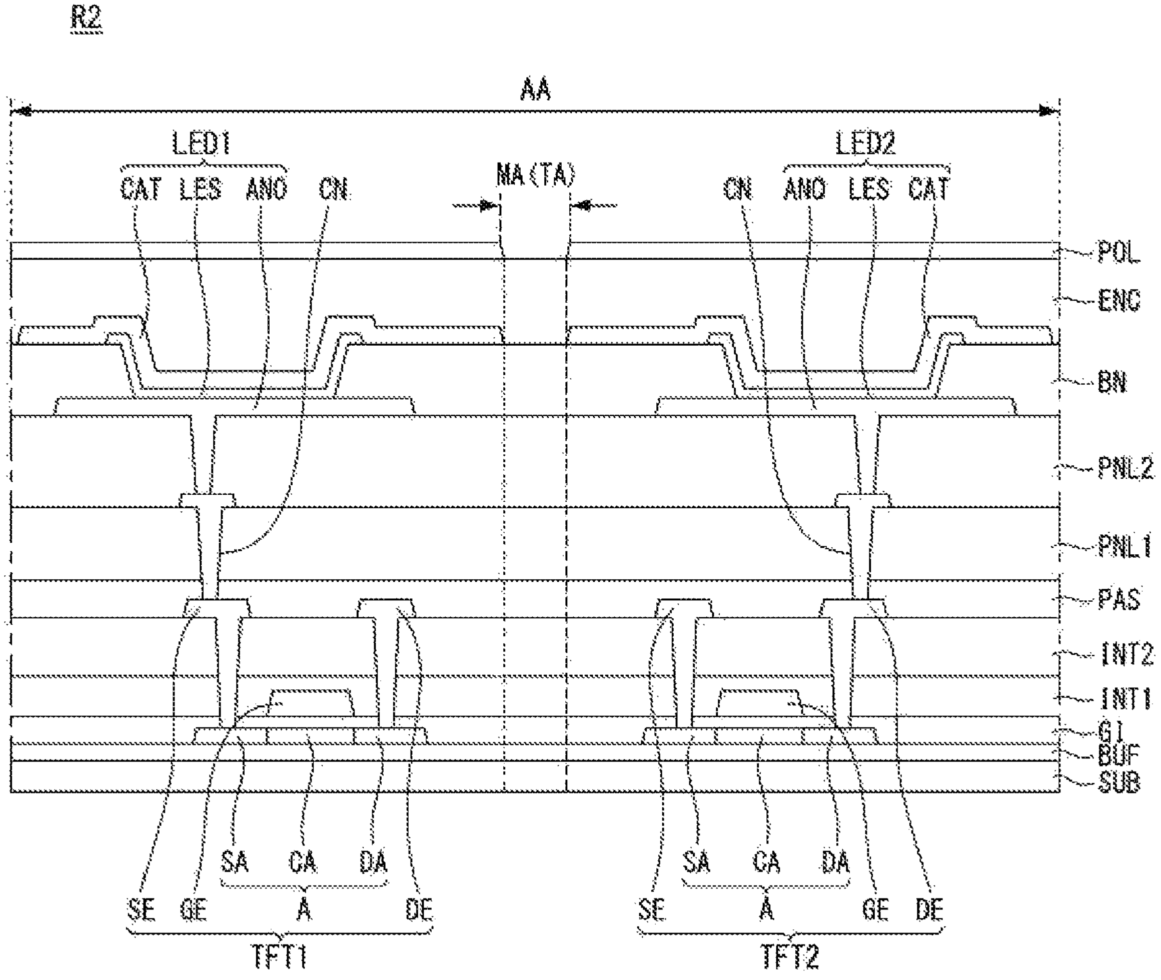
FIG. 3 is a cross-sectional view illustrating a single layer structure of a region R2 in FIG. 2 according to an embodiment of the disclosure.

Referring to FIG. 3, a buffer layer BUF having a single-layer structure or a multi-layer structure may be disposed on a substrate SUB. The substrate SUB may be formed of a flexible reflective-transmissive material. When the substrate SUB is formed of a material such as polyimide, the buffer layer BUF may be formed of any one of an inorganic material and an organic material to prevent damage to the light emitting device due to an impurity such as an alkali ion, or the like, that flows out from the substrate SUB during a subsequent process. The inorganic material may include any one of silicon oxide ($SiO_2$) and silicon nitride (SiNx), and the organic material may include photoacryl.

A semiconductor layer A is positioned on the buffer layer BUF at each pixel of the active area AA. The semiconductor layer A includes a source region SA and a drain region DA spaced apart from each other with a channel region CAT interposed therebetween. The source region SA and the drain region DA are conductive regions. The semiconductor layer A may be formed using amorphous silicon or polycrystalline silicon crystallized from amorphous silicon. Alternatively, the semiconductor layer A may be formed of any one of zinc oxide (ZnO), indium zinc oxide (InZnO), indium gallium zinc oxide (InGaZnO), and zinc tin oxide (ZnSnO). Further, the semiconductor layer A may be formed of a low-molecular or high-molecular organic material such as melocyanine, phthalocyanine, pentacene or thiophene polymer.

A gate insulating film GI is positioned on the buffer layer BUF on which the semiconductor layer A is positioned, to cover the semiconductor layer A. The gate insulating film GI may be formed of a silicon oxide film (SiOx), a silicon nitride film (SiNx), or a dual-layer thereof.

A gate electrode GE of the TFT and a gate line (not shown) connected to the gate electrode are disposed on the gate insulating film GI in the active area AA such that at least a partial region thereof overlaps the channel layer CAT of the semiconductor layer A. The gate electrode GE and the gate line may be formed of any one selected from the group consisting of molybdenum (Mo), aluminum (Al), chrome (Cr), gold (Au), titanium (Ti), nickel (Ni), and copper (Cu), or an alloy thereof, and may be formed as a single layer or multiple layers.

First and second interlayer insulating films INT1 and INT2 are sequentially disposed on the gate insulating film GI on which the gate electrode GE and the gate lines are disposed, to cover them. The first and second interlayer insulating films INT1 and INT2 may be formed of a silicon oxide film (SiOx) or a silicon nitride film (SiNx). One of the first and second interlayer insulating films INT1 and INT2 may be omitted.

A source electrode SE and a drain electrode DE of the TFT and a data line (not shown) connected to the source electrode SE are disposed on the second interlayer insulating film INT2 in the active area AA. The source electrode SE and the drain electrode DE are connected to the source region SA and the drain region DA of the semiconductor layer exposed through contact holes penetrating through the gate insulating film GI and the first and second interlayer insulating films INT1 and INT2, respectively.

A first planarizing film PNL1 may be positioned on a passivation film PAS covering the source electrode SE and the drain electrode DE. The first planarizing film PNL1 serves to protect a lower structure, while alleviating a step coverage of the lower structure, and may be formed of a silicon oxide film (SiOx) or a silicon nitride film (SiNx).

On the first planarizing film PNL1, a connection electrode CN for connecting the anode electrode ANO to the drain electrode DE, which will be described later, is disposed in the active area AA.

On the first planarizing film PNL1, a second planarizing film PNL2 is positioned to cover the connection electrode CN. The second planarizing film PNL2 may be a planarizing film for additionally protecting the lower structure, while further alleviating the step coverage of the lower structure due to the connection electrode CN on the first planarizing film PNL1. The second planarizing film PNL2 may be formed of a siloxane-based organic material.

The anode electrode ANO is positioned on the second planarizing film PNL2 in the active area AA. The anode electrode ANO is connected to the connection electrode CN exposed through a contact hole penetrating through the second planarizing film PNL2. The anode electrode ANO may be formed of a transparent conductive material such as indium tin oxide (ITO), indium zinc oxide (IZO), or zinc oxide (ZnO).

On the second planarizing film PNL2, a bank layer BN having an opening OL exposing the anode electrode ANO is formed in the active area AA. The opening of the bank layer BN is a region defining an emission area LA.

A light emitting stack LES and a cathode electrode CAT are sequentially arranged on the anode electrode ANO exposed through the emission area of the bank layer BN. The light emitting stack LES may be formed on the anode electrode ANO in order of a hole-related layer, an organic light emitting layer, and an electron-related layer, or in the reverse order. The cathode electrode CAT may be disposed on the second planarizing film PNL2 so as to cover the bank layer BN and the light emitting stack LES in the entire region of the active area AA. It is preferable that the cathode electrode CAT is not positioned in the module area MA. The cathode electrode CAT may be formed of magnesium (Mg), calcium (Ca), aluminum (Al), silver (Ag), or an alloy thereof having a low work function.

An encapsulation layer ENC may be positioned on the second planarizing film PNL2 to cover the cathode electrode CAT and the bank layer BL in the active area AA and the bezel area BA. The encapsulation layer ENC may serve to minimize penetration of moisture or oxygen from the outside into the light emitting stack LES positioned in the encapsulation layer DNC and may have a multilayer structure in which an inorganic layer and an organic layer are alternately arranged.

A polarizer POL may be positioned on the encapsulation layer ENC in order to reduce a factor of external light such as surface reflection that external light is reflected from a surface of the display panel or electrode reflection that external light traveling to the inside of the display panel is reflected from electrodes inside the display panel.

On a lower surface of the substrate SUB corresponding to the module area MA of the active area AA, elements difficult to be integrated into the display panel such as a camera module, a speaker module, and a sensor module may be arranged.

The module area MA is a transmissive area TA through which light may be transmitted. The module area MA is an area from which an opaque material such as signal lines including the gate lines and the data line, the power line, the electrodes, and the like, or a material not having good light transmittance is removed. In the example of FIG. 3, the TFT1 and the light emitting diode LED arranged in the pixel above the module area MA illustrated in FIG. 2 and the TFT2 and the light emitting diode LED2 arranged in the pixel below the module area MA are illustrated for simplification of description.

As described above, according to the display apparatus according to the embodiment of the disclosure, since the module area MA allowing light to be transmitted therethrough is formed in the active area AA of the display panel through a display panel manufacturing process even without using a separate mask, a complicated manufacturing process may be avoided and a manufacturing time and cost may be reduced.

Further, since the module area MA may be positioned at any desired position in the active area AA, and all the remaining active areas, excluding the module area MA, may be utilized as a display area, it is possible to increase the degree of freedom in design.

It will be apparent to those skilled in the art that various modifications and variations may be made in the disclosure without departing from the spirit or scope of the disclosure. In the example illustrated in the disclosure, the electroluminescence display apparatus has been described but the disclosure is not limited thereto and may be applied to various flat display apparatuses such as a liquid crystal display apparatus (LCD), a plasma display panel (PDP), a field emission display apparatus (FED), and an electrophoretic display apparatus (ED). Therefore, the technical scope of the disclosure should not be limited to the contents described in the detailed description of the disclosure but should be defined by the claims.

What is claimed is:

1. A display apparatus comprising:

a display panel including an active area including at least one module area, wherein a pixel array is positioned in the active area;

a bezel area positioned outside the active area;

a first potential supply electrode disposed in the bezel area to supply a first potential to the pixel array of the active area;

a second potential supply electrode disposed in the bezel area to supply a second potential lower than the first potential to the pixel array of the active area; and first potential supply lines connected to the first potential supply electrode, extended to the active area and disposed to avoid the at least one module area, wherein the at least one module area is formed as a light-transmissive area including only at least one insulation layer between adjacent pixels of the pixel array, and wherein the at least one module area transmits light incident on one surface of the display panel to at least one module disposed to overlap the at least one module area on another surface of the display panel.

2. The display apparatus of claim 1, wherein the at least one module area is positioned in the active area such that information is displayed in at least two regions of an upper side, a lower side, a left side, and a right side of the at least one module area.

3. The display apparatus of claim 1, further comprising:

gate lines and data lines disposed in the active area to supply a gate signal and a data signal to the pixel array, wherein the gate lines and the data lines are disposed to avoid the at least one module area.

4. The display apparatus of claim 3, wherein both ends of the first potential supply electrode and another first potential supply electrode are connected by link lines disposed in the bezel area.

5. The display apparatus of claim 1, further comprising:

another first potential supply electrode disposed on the bezel area to supply the first potential to the pixel array.

6. The display apparatus of claim 5, further comprising:

shift registers of a gate driver disposed in the bezel area positioned on both sides of the active area to generate a gate signal to be supplied to the pixel array.

7. The display panel of claim 1, wherein each pixel in the pixel array includes a light emitting diode (LED), a driving thin film transistor (TFT), at least one switching TFT and at least one storage capacitor.

8. The display panel of claim 7, wherein the LED includes an anode electrode, a cathode electrode and a light emitting structure between the anode electrode and the cathode electrode, wherein the cathode electrode is removed in at the at least one module area.

9. The display panel of claim 1, further comprising: gate lines disposed in the active area to supply gate signals to the pixel array, data lines disposed in the active area to supply data signals to the pixel array, power lines disposed in the active area to supply power to the pixel array, and electrodes disposed in the active area, wherein the gate lines, the data lines, the power lines, and the electrodes are not formed in the at least one module area.

10. The display panel of claim 1, wherein one of a camera, a speaker or a sensor is disposed on the another surface of the display panel by overlapping the at least one module area.

11. The display panel of claim 1, further comprising:

gate lines disposed in the active area to supply gate signals to the pixel array; and data lines disposed in the active area to supply data signals to the pixel array, wherein the gate lines and the data lines are disposed to avoid the at least one module area.

* * * * *